(12) United States Patent
Feng

(10) Patent No.: US 12,353,901 B2
(45) Date of Patent: Jul. 8, 2025

(54) VIRTUAL MACHINE MIGRATION METHOD AND DEVICE

(71) Applicant: HUAWEI TECHNOLOGIES CO., LTD., Shenzhen (CN)

(72) Inventor: Yubo Feng, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 688 days.

(21) Appl. No.: 17/666,908

(22) Filed: Feb. 8, 2022

(65) Prior Publication Data

US 2022/0164215 A1 May 26, 2022

Related U.S. Application Data

(63) Continuation of application No. PCT/CN2020/110843, filed on Aug. 24, 2020.

(30) Foreign Application Priority Data

Aug. 22, 2019 (CN) .......................... 201910778657.3

(51) Int. Cl.
*G06F 9/455* (2018.01)

(52) U.S. Cl.
CPC .. *G06F 9/45558* (2013.01); *G06F 2009/4557* (2013.01); *G06F 2009/45583* (2013.01)

(58) Field of Classification Search
None
See application file for complete search history.

(56) References Cited

U.S. PATENT DOCUMENTS

| | | | |
|---|---|---|---|
| 9,176,764 B1* | 11/2015 | Jorgensen | G06F 9/5016 |
| 2015/0261581 A1* | 9/2015 | Wang | G06F 3/0647 |
| | | | 711/162 |

(Continued)

FOREIGN PATENT DOCUMENTS

| | | |
|---|---|---|
| CN | 103955399 A | 7/2014 |
| CN | 104598303 A | 5/2015 |

(Continued)

OTHER PUBLICATIONS

A. Colesa, T. Bura, A. Pop and S. Lukács, "Fast creation of short-living virtual machines using copy-on-write RAM-disks," 2014 IEEE International Conference on Automation, Quality and Testing, Robotics, Cluj-Napoca, Romania, 2014, pp. 1-6 (Year: 2014).*

(Continued)

*Primary Examiner* — Frank D Mills
(74) *Attorney, Agent, or Firm* — Maier & Maier, PLLC

(57) ABSTRACT

A first device receives a migration instruction sent by a second device and creates a target virtual machine of a to-be-migrated virtual machine that is in the first device. Then, the first device receives a memory bitmap of the to-be-migrated virtual machine from the second device, where the memory bitmap may indicate whether data of each memory unit in a memory of the to-be-migrated virtual machine is stored in a non-volatile memory or a volatile memory. In a virtual machine migration process, the first device stores, based on the memory bitmap, data in the memory of the to-be-migrated virtual machine into a volatile memory and a non-volatile memory of the target virtual machine.

14 Claims, 4 Drawing Sheets

(56) References Cited

U.S. PATENT DOCUMENTS

| | | | |
|---|---|---|---|
| 2015/0317177 A1* | 11/2015 | Hussain | H04L 67/1097 |
| | | | 718/1 |
| 2017/0147371 A1* | 5/2017 | Tsirkin | G06F 9/45558 |
| 2017/0364394 A1 | 12/2017 | Fujita | |
| 2018/0276018 A1 | 9/2018 | Delaney et al. | |
| 2019/0068557 A1* | 2/2019 | Noel | G06F 21/602 |
| 2020/0341797 A1* | 10/2020 | Tsirkin | G06F 3/0647 |

FOREIGN PATENT DOCUMENTS

| | | |
|---|---|---|
| CN | 110134492 A | 8/2019 |
| WO | 2016205978 A1 | 12/2016 |

OTHER PUBLICATIONS

K. Zhong, D. Liu, L. Liang, L. Long, Y. Lin and Z. Shao, "FLIC: Fast, lightweight checkpointing for mobile virtualization using NVRAM," 2016 Design, Automation & Test in Europe Conference & Exhibition (DATE), Dresden, Germany, 2016, pp. 1562-1567. (Year: 2016).*

K. Zhong et al., "Towards Fast and Lightweight Checkpointing for Mobile Virtualization Using NVRAM," in IEEE Transactions on Parallel and Distributed Systems, vol. 30, No. 6, pp. 1421-1433, Jun. 1, 2019 (Year: 2019).*

Tan et al., "Optimizing Virtual Machine Live Migration in Distributed Edge Servers Based on Hybrid Memory", 2019 International Conference on High Performance Big Data and Intelligent Systems (HPBD&IS), IEEE, May 9, 2019, XP033560855, 6 pages.

* cited by examiner

VIRTUAL MACHINE MIGRATION METHOD AND DEVICE

CROSS-REFERENCE TO RELATED APPLICATIONS

This application is a continuation of International Application No. PCT/CN2020/110843, filed on Aug. 24, 2020, which claims priority to Chinese Patent Application No. 201910778657.3, filed on Aug. 22, 2019, both of which are hereby incorporated by reference in their entireties.

TECHNICAL FIELD

The embodiments relate to the field of storage technologies, and in particular, to a virtual machine migration method and a device.

BACKGROUND

Virtual machine migration refers to migrating a virtual machine from one host to another. A virtual machine migration process may be divided into two parts: migration of a processor state (for example, a storage state of a register) and migration of memory data of the virtual machine. Migration of the processor state may be completed instantaneously.

The memory data of the virtual machine is usually migrated in an online migration manner. In a process of keeping the virtual machine running normally on a source host, the memory data of the virtual machine is migrated from a memory of the source host to a destination host, to complete cross-host migration of the memory data of the virtual machine.

Currently, a memory used by a host includes two types of memories with different performance, for example, a volatile memory and a non-volatile memory. In this way, memory data of a virtual machine is stored in two different memories of a source host. For example, active data (such as some memory data that needs to be frequently read and written) of the virtual machine is stored in a volatile memory of the source host, and some inactive data (such as some memory data that does not need to be frequently read and written) is stored in a non-volatile memory of the source host. When the memory data of the virtual machine is migrated in an online migration manner, the source host does not distinguish between the inactive data and the active data, but directly packs the data, and sends the packed data to a destination host. After receiving the data, the destination host stores the received data into a volatile memory of the destination host. As the source host continuously sends the memory data of the virtual machine to the destination host, idle storage space in the volatile memory of the destination host gradually decreases. When there is no idle storage space in the volatile memory, the destination host may store, according to a sequence of receiving the data, memory data that is of the virtual machine and that is first received into a non-volatile memory of the destination host.

As a result, the active data is stored in the non-volatile memory of the destination host. After being migrated to the destination host, the virtual machine needs to access some active data from the non-volatile memory of the destination host, thereby affecting data access latency.

SUMMARY

The embodiments provide a virtual machine migration method and a device, to improve migration efficiency of memory data of a virtual machine.

According to a first aspect, the embodiments provide a virtual machine migration method, where the method is performed by a first device, and the method includes: the first device may receive a migration instruction sent by a second device, where the migration instruction may be used to instruct the first device to create a target virtual machine corresponding to a to-be-migrated virtual machine that is in the first device. The migration instruction may carry a time period of virtual machine migration and may further carry configuration information of the to-be-migrated virtual machine. In this way, the first device may create, according to the migration instruction, the target virtual machine of the to-be-migrated virtual machine that is in the first device, where the to-be-migrated virtual machine and the target virtual machine have the same configuration, and both the to-be-migrated virtual machine and the target virtual machine include a non-volatile memory and a volatile memory. Then, the first device may further receive a memory bitmap that is of the to-be-migrated virtual machine and that is sent by the second device. The memory bitmap may indicate whether data of each memory unit in a memory of the to-be-migrated virtual machine is stored in a non-volatile memory or a volatile memory.

In a virtual machine migration process, the first device receives data that is in the memory of the to-be-migrated virtual machine and that is sent by the second device, and may further store, based on the memory bitmap, the data in the memory of the to-be-migrated virtual machine into a volatile memory and a non-volatile memory that are of the target virtual machine.

By using the foregoing method, after virtual machine migration is performed by the first device and the second device, distribution situations that are of memory data of the target virtual machine in the first device and that are in the volatile memory and the non-volatile memory can be close to distribution situations that are of memory data of the to-be-migrated virtual machine in the second device and that are in the volatile memory and the non-volatile memory. The non-volatile memory of the target virtual machine may store fewer active data, thereby improving migration efficiency of memory data of a virtual machine and ensuring a running speed of the target virtual machine after the target virtual machine resumes running.

In a possible implementation, when storing, based on the memory bitmap, the data in the memory of the to-be-migrated virtual machine into the volatile memory and the non-volatile memory that are of the target virtual machine, the first device may store, according to an indication of the memory bitmap, memory data stored in the volatile memory of the to-be-migrated virtual machine into the volatile memory of the target virtual machine, and store memory data stored in the non-volatile memory of the to-be-migrated virtual machine into the non-volatile memory of the target virtual machine.

For example, each time receiving a data packet transmitted by the second device, the first device determines, based on the memory bitmap, whether data of each memory unit included in the data packet is stored in the volatile memory or the non-volatile memory. Then, data that is of the memory unit in the data packet and that is stored in the volatile memory according to the indication of the memory bitmap is stored in the volatile memory of the target virtual machine. Data that is of the memory unit in the data packet and that is stored in the non-volatile memory according to the indication of the memory bitmap is stored in the non-volatile memory of the target virtual machine.

By using the foregoing method, distribution situations that are of the memory data of the target virtual machine in the first device and that are in the volatile memory and the non-volatile memory may be basically consistent with distribution situations that are of the memory data of the to-be-migrated virtual machine in the second device and that are in the volatile memory and the non-volatile memory. The non-volatile memory of the target virtual machine may store fewer active data. After the target virtual machine resumes running, a running state of the target virtual machine can be consistent with a running state of the to-be-migrated virtual machine before the migration.

In a possible implementation, when storing, based on the memory bitmap, the data in the memory of the to-be-migrated virtual machine into the volatile memory and the non-volatile memory that are of the target virtual machine, the first device may first sequentially migrate the data in the memory of the to-be-migrated virtual machine into the volatile memory. In a process of migrating the data to the volatile memory, it is determined whether data in the volatile memory is greater than or equal to a threshold. When the data in the volatile memory is greater than or equal to the threshold, data that is currently stored in the volatile memory of the target virtual machine but should be stored in the non-volatile memory according to the indication of the memory bitmap is migrated to the non-volatile memory of the target virtual machine based on the memory bitmap.

By using the foregoing method, memory data stored in the non-volatile memory in the target virtual machine may be the memory data stored in the non-volatile memory of the to-be-migrated virtual machine. Memory data stored in the volatile memory in the target virtual machine is the memory data stored in the volatile memory of the to-be-migrated virtual machine. After the target virtual machine resumes running, the running state of the target virtual machine is comparatively good.

In a possible implementation, when storing, based on the memory bitmap, the data in the memory of the to-be-migrated virtual machine into the volatile memory and the non-volatile memory that are of the target virtual machine, the first device may further receive memory rewriting data that is sent by the second device and that is during migration of the data in the memory of the to-be-migrated virtual machine, and location information that is of a memory unit into which the memory rewriting data is written and that is in the memory bitmap. Optionally, the first device may further receive an updating bit of the memory bitmap, where the updating bit is used to indicate whether the memory rewriting data is stored in the non-volatile memory or the non-volatile memory. Then, the first device may update the memory rewriting data to the volatile memory or the non-volatile memory of the target virtual machine based on the location information that is of the memory unit into which the memory rewriting data is written and that is in the memory bitmap and update a corresponding bit in the memory bitmap based on the updating bit of the memory bitmap.

By using the foregoing method, the first device can receive, from the second device, rewritten data that is in the memory and the updating bit of the memory bitmap, so that the first device may receive comparatively complete memory data of the to-be-migrated virtual machine that is in the second device. Updating the memory bitmap may also enable the memory bitmap to accurately indicate a storage location of the memory data of the to-be-migrated virtual machine. Then, the first device may migrate the memory data of the target virtual machine in the first device based on an updated memory bitmap.

In a possible implementation, when storing, based on the memory bitmap, the data in the memory of the to-be-migrated virtual machine into the volatile memory and the non-volatile memory that are of the target virtual machine, the first device may further receive memory write data that is sent by the second device and that is during migration of the data in the memory of the to-be-migrated virtual machine, location information that is of a memory unit into which the memory write data is written and that is in the memory bitmap, and an updating bit of the memory bitmap, where the updating bit may indicate whether the memory write data is stored in the non-volatile memory or the non-volatile memory. Then, the first device may store the memory write data into the volatile memory or the non-volatile memory of the target virtual machine based on the location information that is of the memory unit into which the memory write data is written and that is in the memory bitmap and add the updating bit of the memory bitmap to the memory bitmap.

By using the foregoing method, the first device can receive, from the second device, data newly written into the memory and the updating bit of the memory bitmap, so that the first device may receive latest and complete memory data of the to-be-migrated virtual machine that is in the second device. Updating the memory bitmap may also enable the memory bitmap to accurately indicate a storage location of the memory data of the to-be-migrated virtual machine. Then, the first device may migrate the memory data of the target virtual machine in the first device based on an updated memory bitmap.

According to a second aspect, the embodiments provide a virtual machine migration method, where the method is performed by a second device, and the method includes: the second device sends a migration instruction to a first device, where the migration instruction is used to instruct the first device to create a target virtual machine corresponding to a to-be-migrated virtual machine that is in the first device, and the migration instruction includes configuration information of the to-be-migrated virtual machine. Then, the second device may further send a memory bitmap of the to-be-migrated virtual machine to the first device, where the memory bitmap is used to indicate whether data of each memory unit in a memory of the to-be-migrated virtual machine is stored in a non-volatile memory or a non-volatile memory, and the to-be-migrated virtual machine includes a non-volatile memory and a volatile memory. In a virtual machine migration process, the second device may send data in the memory of the to-be-migrated virtual machine to the first device.

By using the foregoing method, when virtual machine migration is performed by the first device and the second device, in addition to sending memory data of the to-be-migrated virtual machine to the first device, the second device further sends the memory bitmap of the to-be-migrated virtual machine to the first device. In this way, the first device can migrate memory data of the target virtual machine in the first device based on the memory bitmap of the to-be-migrated virtual machine. In this way, a non-volatile memory of the first device may store fewer active data, thereby improving migration efficiency of memory data of the virtual machine and ensuring a running speed of the target virtual machine after the target virtual machine resumes running.

In a possible implementation, before sending the memory bitmap of the to-be-migrated virtual machine to the first device, the second device needs to first generate the memory bitmap of the to-be-migrated virtual machine. For example, the second device may traverse each memory unit in the memory of the to-be-migrated virtual machine; determine, based on a physical address of each memory unit in the memory of the to-be-migrated virtual machine, whether data of each memory unit in the memory of the to-be-migrated virtual machine is stored in the non-volatile memory or the non-volatile memory; and generate the memory bitmap of the to-be-migrated virtual machine.

By using the foregoing method, the second device may determine a storage location of the memory data of the to-be-migrated virtual machine by traversing the memory data of the to-be-migrated virtual machine and may further accurately generate the memory bitmap of the to-be-migrated virtual machine.

In a possible implementation, in a process of sending the memory data of the to-be-migrated virtual machine to the first device, the second device may record memory rewriting data of the to-be-migrated virtual machine and location information that is of a memory unit into which the memory rewriting data is written and that is in the memory bitmap, and may further generate an updating bit of the memory bitmap, where the updating bit is used to indicate whether the memory rewriting data is stored in the non-volatile memory or the non-volatile memory. The second device sends, to the first device, the memory rewriting data, the location information that is of the memory unit into which the memory rewriting data is written and that is in the memory bitmap, and the updating bit of the memory bitmap.

By using the foregoing method, the second device records a rewriting situation of the memory data of the to-be-migrated virtual machine, and further determines rewritten data in the memory and the updating bit of the memory bitmap, so that the first device may receive latest memory data and the accurate memory bitmap that are of the to-be-migrated virtual machine.

In a possible implementation, when sending the data in the memory of the to-be-migrated virtual machine to the first device, in a process of sending the memory data of the to-be-migrated virtual machine to the first device, the second device may record memory write data of the to-be-migrated virtual machine and location information that is of a memory unit into which the memory write data is written and that is in the memory bitmap, and may further generate an updating bit of the memory bitmap, where the updating bit is used to indicate whether the memory write data is stored in the non-volatile memory or the non-volatile memory. The second device sends, to the first device, the memory write data, the location information that is of the memory unit into which the memory write data is written and that is in the memory bitmap, and the updating bit of the memory bitmap.

By using the foregoing method, the second device records a write situation of the memory data of the to-be-migrated virtual machine, and further determines data newly written into the memory and the updating bit of the memory bitmap, so that the first device may receive latest memory data and the accurate memory bitmap that are of the to-be-migrated virtual machine.

According to a third aspect, an embodiment further provides a device. For beneficial effects, refer to descriptions of the first aspect. Details are not described herein again. The device has a function of implementing the behavior in the method example of the first aspect. The function may be implemented by hardware or may be implemented by hardware executing corresponding software. The hardware or software includes one or more modules corresponding to the foregoing functions. A structure of the device may include a receiving unit and a processing unit. These units may perform corresponding functions in the method example of the first aspect. For details, refer to detailed descriptions in the method example. Details are not described herein again.

According to a fourth aspect, an embodiment further provides a device. For beneficial effects, refer to descriptions of the second aspect. Details are not described herein again. The device has a function of implementing the behavior in the method example of the second aspect. The function may be implemented by hardware or may be implemented by hardware executing corresponding software. The hardware or software includes one or more modules corresponding to the foregoing functions. A structure of the device may include a sending unit and a processing unit. These units may perform corresponding functions in the method example of the second aspect. For details, refer to detailed descriptions in the method example. Details are not described herein again.

According to a fifth aspect, an embodiment further provides a device. For beneficial effects, refer to descriptions of the first aspect. Details are not described herein again. A structure of a communications apparatus includes a processor and a memory, and the processor is configured to support a terminal in performing a corresponding function in the method of the first aspect. The memory is coupled to the processor, and stores program instructions and data that are necessary for the communications apparatus. The structure of the communications apparatus further includes a communications interface, configured to communicate with another device.

According to a sixth aspect, an embodiment further provides a device. For beneficial effects, refer to descriptions of the second aspect. Details are not described herein again. A structure of a communications apparatus includes a processor and a memory, and the processor is configured to support a terminal in performing a corresponding function in the method of the second aspect. The memory is coupled to the processor, and stores program instructions and data that are necessary for the communications apparatus. The structure of the communications apparatus further includes a communications interface, configured to communicate with another device.

According to a seventh aspect, the embodiments further provide a computer-readable storage medium. The computer-readable storage medium stores instructions, and when the instructions are run on a computer, the computer is enabled to perform the methods of the foregoing aspects.

According to an eighth aspect, the embodiments further provide a computer program product including instructions. When the computer program product runs on a computer, the computer is enabled to perform the methods of the foregoing aspects.

According to a tenth aspect, the embodiments further provide a computer chip. The chip is connected to a memory, and the chip is configured to read and execute a software program stored in the memory, to perform the methods of the foregoing aspects.

DETAILED DESCRIPTION OF THE EMBODIMENTS

Figure 1:
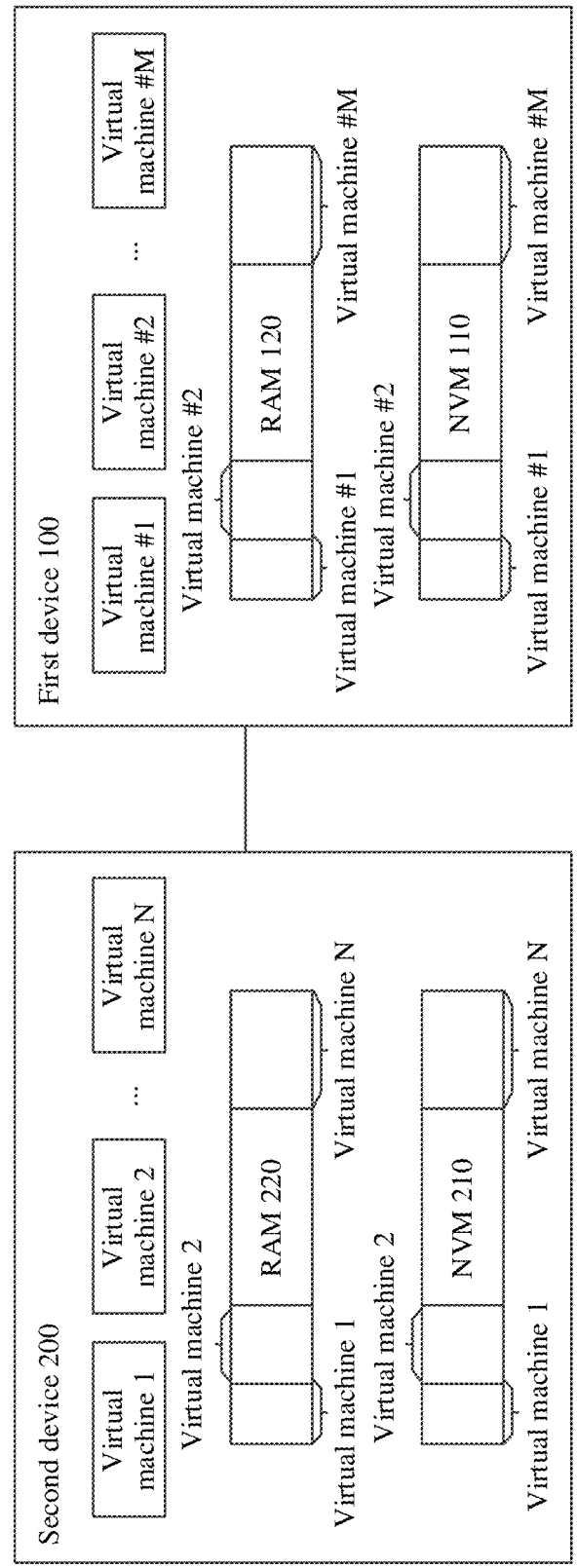
FIG. 1 is a schematic diagram of a system architecture.

FIG. 1 is a schematic diagram of a system architecture according to an embodiment. The system includes a first device 100 and a second device 200. In this embodiment, the first device 100 is a destination host for virtual machine migration, and the second device 200 is a source host for virtual machine migration, that is, a host where a to-be-migrated virtual machine resides before migration.

One or more virtual machines may be deployed in the second device 200. The virtual machines are respectively a virtual machine 1, a virtual machine 2, . . . , and a virtual machine N. Memory data of each virtual machine deployed in the second device 200 may be distributed in a physical memory of the second device 200. In this embodiment, the physical memory of the second device 200 may be classified into two types. One type is a non-volatile memory (NVM) 210. Data stored in this type of memory will not be lost after the second device 200 is powered on after being powered off. However, a read/write speed of the NVM 210 is usually comparatively low, and the NVM 210 may be configured to store data that is not frequently read and written (the data is referred to as inactive data for ease of description). A form of the non-volatile memory 210 is not limited in this embodiment. For example, the non-volatile memory 210 may be an AEP (apache pass) or may be another non-volatile memory. The other type is a volatile memory (for example random access memory, RAM) 220. Data stored in this type of memory will be lost after the second device 200 is powered on after being powered off. However, the RAM 220 has a comparatively high read/write speed, and the RAM 220 may be configured to store data that needs to be frequently read and written (the data is referred to as active data for ease of description). A form of the volatile memory 220 is not limited in this embodiment. For example, the volatile memory 220 may be a dynamic random access memory (DRAM) or may be a static random access memory (SRAM).

For any virtual machine in the second device 200, a part of storage space (for example, one or more memory pages) may be obtained through division from the non-volatile memory 210 and the volatile memory 220 that are in the second device 200 as a memory of a virtual machine. In this way, a memory of each virtual machine also includes a non-volatile memory 210 and a volatile memory 220.

The first device 100 is used as the destination host for virtual machine migration. When virtual machine migration starts, the first device 100 creates a virtual machine whose configuration is the same as that of a to-be-migrated virtual machine, for example, a virtual machine #1. If the second device 200 needs to migrate a plurality of virtual machines to the first device 100, the first device may create a plurality of virtual machines, for example, the virtual machines are respectively the virtual machine #1, a virtual machine #2, . . . , and a virtual machine #M. A quantity of virtual machines created in the first device 100 is the same as a quantity of virtual machines that need to be migrated by the second device 200. In this embodiment, a physical memory of the first device 100 is the same as the physical memory of the second device 200 and may be classified into two types: an NVM 110 and a RAM 120. Memory data of each virtual machine deployed in the first device 100 may be distributed in the physical memory of the first device 100.

In this embodiment, when migrating a virtual machine to the first device 100, the second device 200 not only needs to send memory data of the to-be-migrated virtual machine, but also sends a memory bitmap of the to-be-migrated virtual machine to the first device 100. The memory bitmap may indicate whether data of each memory page in a memory of the to-be-migrated virtual machine is stored in the non-volatile memory 210 or the volatile memory 220. In this way, the first device 100 may store data in the memory of the to-be-migrated virtual machine into the volatile memory 120 and the non-volatile memory 110 that are of a target virtual machine based on the memory bitmap. By using this manner, distribution situations that are of memory data of the target virtual machine and that are in the volatile memory 120 and the non-volatile memory 110 can be close to distribution situations that are of the memory data of the to-be-migrated virtual machine and that are in the volatile memory 220 and the non-volatile memory 210. The non-volatile memory 210 stores fewer active data, thereby ensuring a running speed of the target virtual machine.

Before the virtual machine migration method provided in this embodiment is described, a method for generating a memory bitmap of a to-be-migrated virtual machine by the first device 100 is first described.

Figure 2:
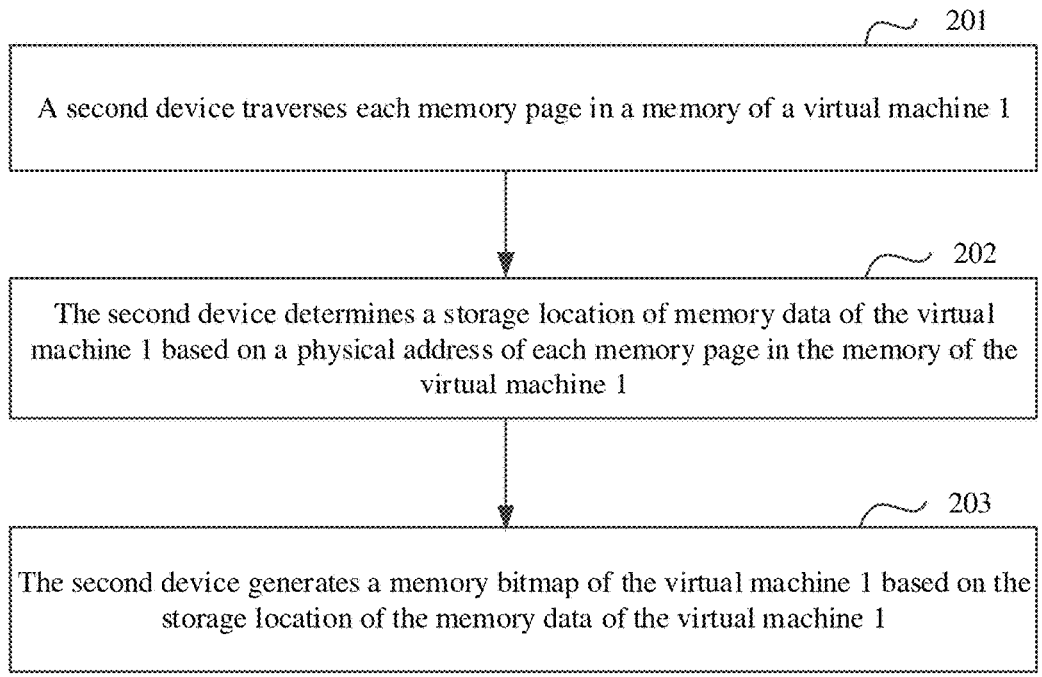
FIG. 2 is a schematic diagram of a method for generating a memory bitmap of a virtual machine.

For example, the to-be-migrated virtual machine is a virtual machine 1. For a method for generating a memory bitmap of the virtual machine 1 by the second device 200, refer to FIG. 2. The method includes the following steps.

Step 201: The second device 200 traverses each memory page in a memory of the virtual machine 1.

Figure 3:
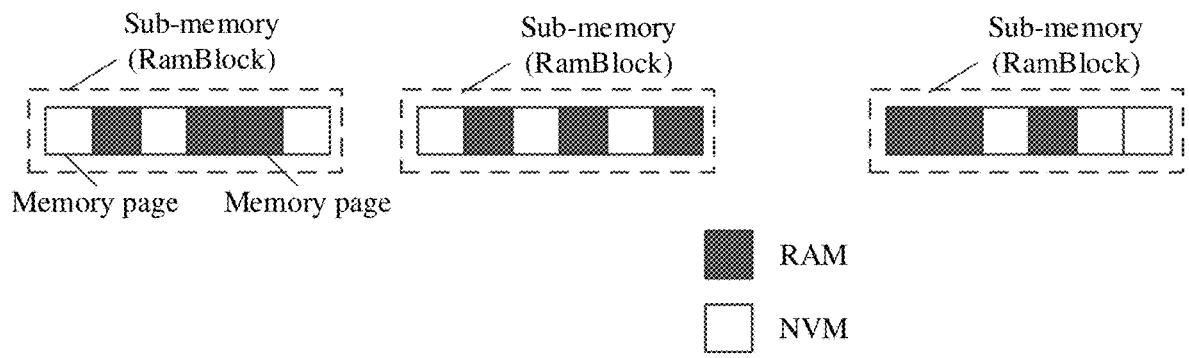
FIG. 3 is a schematic structural diagram of a memory of a virtual machine.

FIG. 3 is a schematic structural diagram of the memory of the virtual machine 1. The memory of the virtual machine 1 includes one or more sub-memories. In this embodiment, an example in which the sub-memory is a RamBlock is used for description.

Each RamBlock includes a plurality of memory pages with consecutive virtual addresses, and each memory page is used to store memory data of the virtual machine 1. Sizes of all memory pages are the same. For example, each memory page may be 4 kilobytes (kB) or may be 8 kb. In other words, an amount of data stored in each memory page is the same. Each memory page is physically a memory page in the RAM 220 or the NVM 210 of the second device 200. In other words, a physical address of each memory page indicates storage space in the RAM 220 or the NVM 210 of the second device 200. Each small square in FIG. 3 is a memory page, where a black square indicates a memory page in the RAM 220 of the second device 200, and a blank square indicates a memory page in the NVM 210 of the second device 200. The second device 200 stores a mapping relationship between a virtual address and a physical address that are of each memory page. One memory page may be considered one memory unit of the virtual machine 1. In this embodiment, that one memory unit is one memory page is used as an example. In this embodiment, a memory unit division manner is not limited. For example, two memory pages with consecutive virtual addresses may be used as one memory unit. Alternatively, the memory of the virtual machine 1 may be divided into a plurality of memory units in another manner.

When traversing each memory page in the memory of the virtual machine 1, the second device 200 may traverse each memory page included in each RamBlock of the virtual machine 1 and query the physical address of each memory page based on a mapping relationship between a virtual address and a physical address that are of a memory page. The physical address of the memory page is a storage address that is of the memory data of the virtual machine 1 (the data is referred to as "data in the memory page" for short) and that is in the memory page.

Step 202: The second device 200 determines a storage location of the memory data of the virtual machine 1 based on a physical address of each memory page in the memory of the virtual machine 1. The second device 200 may determine whether data of each memory page in the memory of the virtual machine is stored in the RAM 220 or the NVM 210.

After determining the physical address of each memory page, the second device 200 may further determine a storage location of data in each memory page and can determine whether the data in each memory page is located in the RAM 220 or the NVM 210.

Step 203: The second device 200 generates the memory bitmap of the virtual machine 1 based on the storage location of the memory data of the virtual machine 1.

Figure 4:
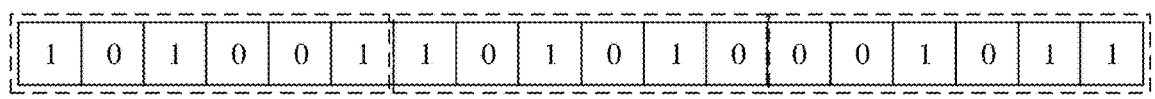
FIG. 4 is a schematic diagram of a memory bitmap of a virtual machine.

After the storage location of the data in each memory page in the memory of the virtual machine 1 in the second device 200 is determined, the second device 200 may generate the memory bitmap of the virtual machine 1. FIG. 4 is a schematic diagram of the memory bitmap (bitmap) of the virtual machine 1. Each bit in the memory bitmap may indicate a location of data in a corresponding memory page.

Starting from a start location in the memory bitmap of the virtual machine 1, every M consecutive bits are a bitmap corresponding to one RamBlock. One bit in a bitmap corresponding to each RamBlock corresponds to one memory page in the RamBlock, and each bit corresponds to a different memory page. M represents a quantity of memory pages included in one RamBlock, and M is 6 in FIG. 4.

In this embodiment, an arrangement order of bitmaps that correspond to RamBlocks and that are in the memory bitmap of the virtual machine 1 is not limited. The bitmaps may be arranged according to a sequence of the RamBlocks in the memory of the virtual machine 1 or may be arranged randomly.

The memory bitmap that is of the virtual machine 1 and that is shown in FIG. 4 is arranged based on a location that is of each RamBlock of the virtual machine 1 and that is in the memory of the virtual machine 1 shown in FIG. 3. The first six consecutive bits are a bitmap corresponding to the first RamBlock, the six consecutive bits in the middle are a bitmap corresponding to the second RamBlock, and the last six consecutive bits are a bitmap corresponding to the third RamBlock.

M bits in the bitmap corresponding to each RamBlock may sequentially correspond to one memory page based on a location that is of each memory page and that is in the RamBlock or may sequentially correspond to one memory page according to another order.

Six bits in the bitmap that corresponds to each RamBlock and that is in the memory bitmap of the virtual machine 1 shown in FIG. 4 are arranged according to a sequence that is of each memory page of the virtual machine 1 and that is in a RamBlock in which the memory page is located as shown in FIG. 3. The bitmap corresponding to the first RamBlock is used as an example. The first bit corresponds to the first memory page of the RamBlock, and the second bit corresponds to the second memory page of the RamBlock. In FIG. 4, 1 indicates that data in a memory page is located in the RAM 220. In this embodiment, 0 indicates that data in a memory page is located in the NVM 210. A manner of marking each bit in the memory bitmap of the virtual machine 1 is not limited in this embodiment.

In a possible implementation, the memory data of the virtual machine 1 is packed in a unit of RamBlock in a migration process. In addition to data of each memory page in a RamBlock, a packed data packet may further carry a RamBlock identifier. To enable the first device 100 to learn, when receiving the memory bitmap of the virtual machine 1, a memory page corresponding to each bit, each bit in the memory bitmap of the virtual machine 1 may be marked. Marked content includes an identifier of a RamBlock in which a memory page corresponding to the bit is located and may further include a location that is of the memory page corresponding to the bit and that is in the RamBlock in which the memory page corresponding to the bit is located. Further, marking may not be performed. The second device 200 may generate the memory bitmap of the virtual machine 1 by using an arrangement order that is of bitmaps corresponding to RamBlocks in a memory bitmap and that is pre-agreed by the first device 100 and the second device 200. For example, the memory bitmap of the virtual machine 1 may be generated in a preset manner in which the bitmap that corresponds to each RamBlock and that is in the memory bitmap of the virtual machine 1 is arranged based on the location that is of each RamBlock of the virtual machine 1 and that is in the memory of the virtual machine 1, and in which the M bits in the bitmap corresponding to each RamBlock sequentially correspond to one memory page based on the location that is of each memory page and that is in the RamBlock.

It should be noted that, in this embodiment, a time at which the second device 200 generates the memory bitmap of the virtual machine 1 is not limited. For example, after the virtual machine 1 is created, the second device 200 may generate the memory bitmap of the virtual machine 1 at the same time. When a read/write operation is performed on the memory data of the virtual machine 1, the memory bitmap of the virtual machine 1 is updated. For another example, when the second device 200 determines that a current physical memory is insufficient for the virtual machine 1 to use, that is, when there is no sufficient physical memory to store the memory data of the virtual machine 1, the second device 200 generates the memory bitmap of the virtual machine 1, and then starts a virtual machine migration process. For another example, after receiving a virtual machine migration indication message triggered by a user, the second device 200 may generate the memory bitmap of the virtual machine 1 and perform virtual machine migration with the first device 100.

Figure 5:
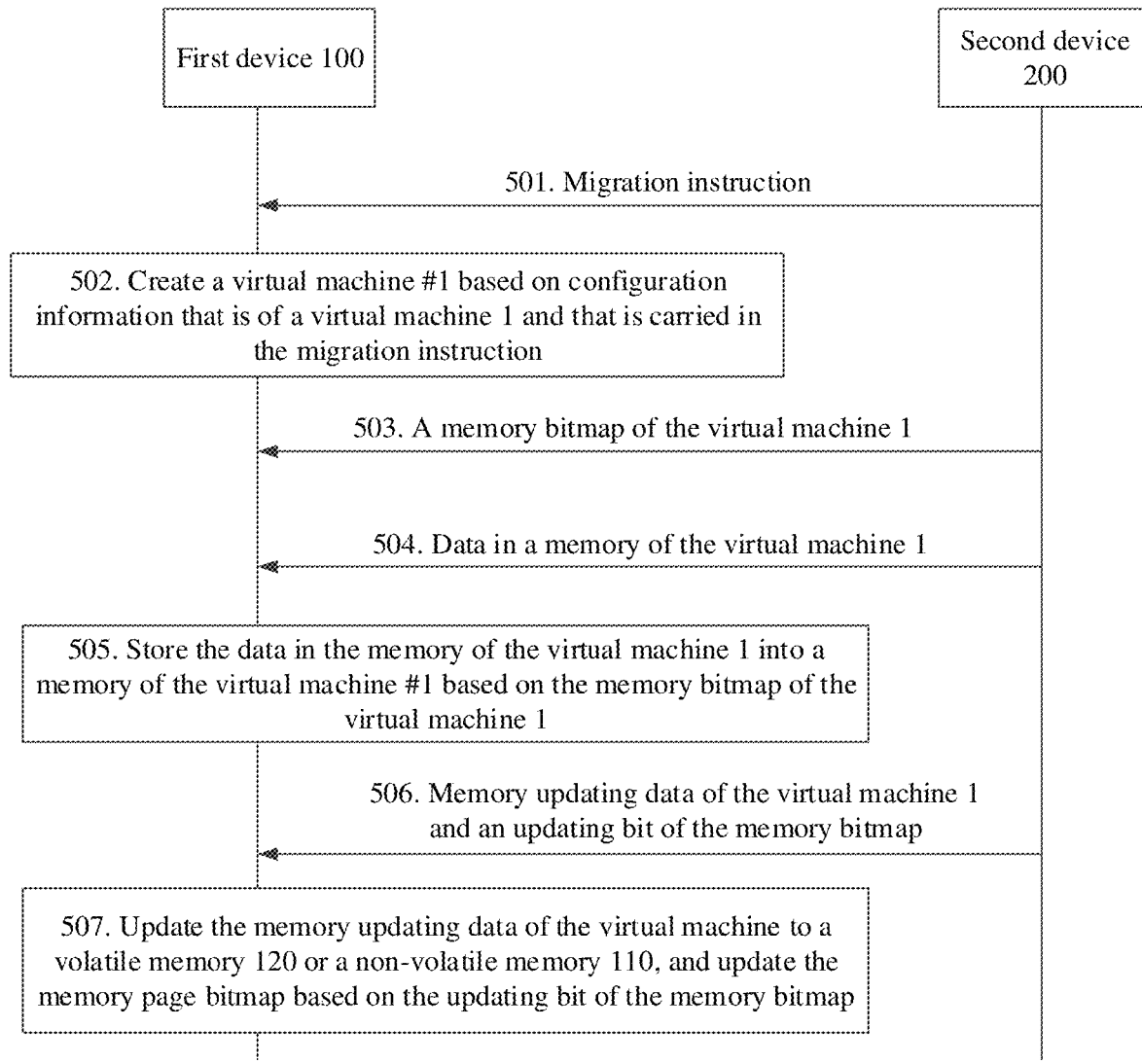
FIG. 5 is a schematic diagram of a virtual machine migration method.

Based on the system architecture shown in FIG. 1, an example in which a to-be-migrated virtual machine is the virtual machine 1 and a target virtual machine is the virtual machine #1 is used below to describe a virtual machine migration method provided in this embodiment. Referring to FIG. 5, the method includes the following steps.

Step 501: The second device 200 sends a migration instruction to the first device 100, where the migration instruction instructs the first device 100 to start a virtual machine migration process and create a virtual machine that is the same as the virtual machine 1.

The migration instruction carries configuration information of the virtual machine 1, for example, a processor resource and a memory resource that are of the virtual machine 1. The memory resource includes a size of the volatile memory 220 and a size of the non-volatile memory 210.

Step 502: After receiving the migration instruction, the first device 100 creates the virtual machine #1 based on the configuration information that is of the virtual machine 1 and that is carried in the migration instruction. The virtual machine #1 and the virtual machine 1 have the same configuration, such as a processor model and a memory size.

After the virtual machine #1 is successfully created, the first device 100 may feed back an acknowledgement (ACK) 1 to the second device 200.

Step 503: After receiving the ACK 1, the second device 200 may send a memory bitmap of the virtual machine 1 to the first device 100.

After receiving the memory bitmap of the virtual machine 1, the first device 100 feeds back an ACK 2 to the second device 200, to notify the second device 200 that the memory bitmap of the virtual machine 1 has been successfully received.

Step 504: The second device 200 packs data in a memory of the virtual machine 1 in a unit of RamBlock and sends the data in the memory of the virtual machine 1 to the first device 100.

A sequence of performing step 503 and step 504 is not limited in this embodiment. For example, step 503 may be performed first. The second device 200 may send to the first device 100 the memory bitmap, including bitmaps that correspond to all RamBlocks and that are in the memory of the virtual machine 1, and then step 504 is performed. For another example, step 503 and step 504 may be alternately performed. The second device 200 may send a bitmap corresponding to one RamBlock of the virtual machine 1. Then, step 504 is performed to send a data packet obtained after data of a memory page of the RamBlock is packed. Step 503 and step 504 are alternately performed, until the second device 200 sends to the first device 100, a data packet obtained after the bitmaps corresponding to all the RamBlocks of the virtual machine 1 and data of a memory page of each RamBlock are packed. For another example, step 503 and step 504 may be performed at the same time. The second device 200 may send, at the same time, the bitmap corresponding to one RamBlock of the virtual machine 1 and the data packet obtained after the data of the memory page of the RamBlock is packed, until the second device 200 sends, to the first device 100, the data packet obtained after the bitmaps corresponding to all the RamBlocks of the virtual machine 1 and the data of the memory page of each RamBlock are packed.

When the second device 200 performs step 504, the virtual machine 1 is still in a running state, and a read/write operation may be performed on memory data that is of the virtual machine 1 and that is stored in the second device 200.

However, in step 504, the write operation performed by the virtual machine 1 on the memory data that is of the virtual machine 1 and that is stored in the second device 200 causes update of the memory data of the virtual machine 1.

The write operation herein is classified into two types: one is writing new memory data in the virtual machine 1, and the other is rewriting existing memory data in the virtual machine 1.

The second device 200 may record a write situation of the memory data of the virtual machine 1 in a process of performing step 504, that is, in a process of migrating the memory data of the virtual machine 1 and determine memory updating data of the virtual machine 1.

For the write operation of writing new memory data, the memory updating data of the virtual machine 1 is newly written data and location information of a memory page into which the newly-written data is written. The location information of the memory page into which the newly written data is written includes an identifier of a RamBlock in which the memory page is located, a location that is of the memory page and that is in the RamBlock, and location information that is of the memory page into which the newly written data is written and that is in the memory bitmap of the virtual machine 1.

For the write operation of rewriting the existing memory data in the virtual machine 1, the memory updating data of the virtual machine 1 is rewritten data and location information of a memory page into which the rewritten data is written. The location information of the memory page into which the rewritten data is written includes an identifier of a RamBlock, a location that is of the memory page and that is in the RamBlock, and location information that is of the memory page into which the rewritten data is written and that is in the memory bitmap of the virtual machine 1.

Step 505: After receiving the data in the memory of the virtual machine 1, the first device 100 may store the data in the memory of the virtual machine 1 into a memory of the virtual machine #1 based on the memory bitmap of the virtual machine 1.

There are many manners in which the first device 100 stores the data in the memory of the virtual machine 1 into the memory of the virtual machine #1, and two of the manners are described in this embodiment.

In a first manner, each time receiving a data packet transmitted by the second device, the first device 100 obtains a bitmap corresponding to a RamBlock in the data packet and determines a location at which data of each memory page in the RamBlock that is indicated by the bitmap is stored. If a bitmap indicates that data of a memory page is stored in the volatile memory 220, the data corresponding to the memory page is stored in a volatile memory 120 of the virtual machine #1. If a bitmap indicates that data of a memory page is stored in the non-volatile memory 210, the data corresponding to the memory page is stored in a non-volatile memory 110 of the virtual machine #1.

For example, data corresponding to a memory page marked by "1" in the bitmap is stored in the volatile memory 120, and data corresponding to a memory page marked by "0" is stored in the non-volatile memory 110.

In a second manner, the first device 100 first stores the memory data of the virtual machine 1 into the volatile memory 120 of the virtual machine #1. When data in the volatile memory 120 of the virtual machine #1 reaches (greater than or equal to) a preset threshold, the first device 100 migrates, based on the memory bitmap of the virtual machine 1, the data currently stored in the volatile memory 120 to the non-volatile memory 110 of the virtual machine #1.

The first device 100 may first sequentially migrate the data in the memory of the virtual machine 1 into the volatile memory 120 of the virtual machine #1. In a migration process, the first device 100 may determine whether data in the volatile memory 120 of the virtual machine #1 is greater than or equal to a threshold. If the data in the volatile memory 120 of the virtual machine #1 is less than the threshold, the first device 100 continues to migrate the memory data of the virtual machine 1 into the volatile memory 120 of the virtual machine #1. If the data in the volatile memory 120 of the virtual machine #1 is greater than or equal to the threshold, some data is migrated from the volatile memory 120 of the virtual machine #1 and stored in the non-volatile memory 110 of the virtual machine #1 based on the memory bitmap. In this way, idle storage space in the volatile memory 120 of the virtual machine #1 may be increased, and the first device 100 may continue to migrate the data in the memory of the virtual machine 1 into the idle storage space. Some data migrated by the first device 100 from the volatile memory 120 of the virtual machine #1 is data stored in the non-volatile memory 210 according to an indication of the memory bitmap of the virtual machine 1.

When the data in the volatile memory 120 is migrated into the non-volatile memory 110, according to a sequence of data migrated into the volatile memory 120, a bitmap corresponding to each RAMblock is obtained based on an identifier of each RAMblock. Data stored in the non-volatile memory 210 according to an indication of the bitmap is migrated from the volatile memory 120 to the non-volatile memory 110 based on a storage location of each memory page in a RAMblock indicated in the bitmap.

Step 506: When step 504 is performed, the first device 100 sends, to the second device 200, the memory updating data of the virtual machine 1 and an updating bit of the memory bitmap that are generated.

If the memory updating data of the virtual machine 1 is newly written data and a memory page on which the newly written data is located, the first device 100 may further send the updating bit of the memory bitmap of the virtual machine 1 to the second device 200. The updating bit is used to indicate whether the newly written data is stored in the non-volatile memory 210 or the volatile memory 220.

If the memory updating data of the virtual machine 1 is rewritten data and a memory page on which the rewritten data is located, and when the memory data of the virtual machine 1 is rewritten in the virtual machine 1, a migration operation of the rewritten data is further performed in the first device 100. For example, data before rewriting is stored in the volatile memory 220 of the virtual machine 1, and rewritten data is stored in the non-volatile memory 210 of the virtual machine 1. For another example, the data before rewriting is stored in the non-volatile memory 210 of the virtual machine 1, and the rewritten data is stored in the volatile memory 220 of the virtual machine 1. In this case, the first device 100 may further send the updating bit of the memory bitmap of the virtual machine 1 to the second device 200, where the updating bit is used to indicate whether the rewritten data is stored in the non-volatile memory 210 or the volatile memory 220. If there is no migration operation of the rewritten data in the first device 100, a storage location that is of data and that is in a physical memory of the first device 100 does not change before and after the data is rewritten, which indicates that the memory bitmap that occurs before does not need to be updated, and the first device 100 does not need to send the updating bit of the memory bitmap.

Step 507: After receiving the memory updating data of the virtual machine 1 and the updating bit of the memory bitmap of the virtual machine 1, the first device 100 may update the memory updating data of the virtual machine to the volatile memory 120 or the non-volatile memory 110 and update the memory page bitmap based on the updating bit of the memory bitmap.

If the memory updating data of the virtual machine 1 is the newly-written data and the location information of the memory page on which the newly-written data is located, the first device 100 may determine, based on the memory page on which the newly-written data is located, a write location that is of the newly-written data and that is in the volatile memory 120 of the virtual machine #1, and write the newly-written data into the volatile memory 120 of the virtual machine #1. If the updating bit of the memory bitmap indicates that the newly written data is stored in the non-volatile memory 210, the first device 100 may directly write the newly written data into the non-volatile memory 110.

The first device 100 may further update the memory bitmap of the virtual machine 1 by using the updating bit of the memory bitmap of the virtual machine 1 based on the location information that is of the memory page into which the newly written data is written and that is in the memory bitmap of the virtual machine 1 and add the updating bit to the memory bitmap of the virtual machine 1.

If the memory updating data of the virtual machine 1 is the rewritten data and the memory page on which the rewritten data is located, the second device 200 determines, based on the memory page on which the rewritten data is located, a write location that is of the rewritten data and that is in the volatile memory 120 (corresponding to a case in which the data before rewriting is stored in the volatile memory 120) or the non-volatile memory 110 (corresponding to a case in which the data before rewriting is stored in the non-volatile memory 110) of the virtual machine #1. The rewritten data is written into the volatile memory 120 or the non-volatile memory 110 of the virtual machine #1, to replace the data before rewriting stored in the volatile memory 120 or the non-volatile memory 110 of the virtual machine #1.

If the second device 200 further sends the updating bit of the memory bitmap, the second device 200 may further update the memory bitmap of the virtual machine 1 by using the updating bit of the memory bitmap of the virtual machine 1 based on the location information that is of the memory page into which the rewritten data is written and that is in the memory bitmap of the virtual machine 1, and replace, with the updating bit, a bit corresponding to a memory page that is in the memory bitmap of the virtual machine 1 and on which the data before rewriting is located.

When the second device 200 performs step 506, the virtual machine 1 is still in the running state, and the read/write operation may still be performed on the memory data that is of the virtual machine 1 and that is stored in the second device 200. The second device 200 may record a write situation of the memory data of the virtual machine 1 in a process of performing step 506 and determine the memory updating data of the virtual machine 1 and the updating bit of the memory bitmap that are generated in the process of step 506.

The second device 200 may perform an operation similar to step 506, and send, to the first device 100, the memory updating data of the virtual machine 1 and the updating bit of the memory bitmap that are generated in the process of step 506. The first device 100 may update the memory updating data of the virtual machine to the volatile memory 120 and update the memory page bitmap based on the updating bit of the memory bitmap.

In other words, the second device 200 may send, to the first device 100, the memory updating data of the virtual machine 1, newly-generated memory updating data that is of the virtual machine 1 and that is generated in the updating bit of the memory bitmap, and the updating bit of the memory bitmap, so that the first device 100 updates data in the volatile memory 120 of the virtual machine #1 and the memory bitmap of the virtual machine 1.

Until the second device 200 determines, based on a preset data transmission rate, that current memory updating data of the virtual machine 1 may be migrated within a specified time period, the second device 200 may stop running the virtual machine 1, and send, to the first device 100, the memory updating data of the virtual machine 1 and the updating bit of the memory bitmap.

After receiving the last sent memory updating data of the virtual machine 1 and the updating bit of the memory bitmap, the first device 100 updates data in the volatile memory 120 or the non-volatile memory 110 of the virtual machine #1 and the memory bitmap of the virtual machine 1. In this way, the memory of the virtual machine #1 may store latest memory data of the virtual machine 1.

Finally, the second device 200 sends information about a register of the virtual machine 1 to the first device 100, and the first device 100 restores a state of a processor of the virtual machine #1 based on the information about the register of the processor of the virtual machine 1. In this way, the virtual machine #1 may run normally, and a virtual machine migration process between the first device 100 and the second device 200 is completed.

Figure 6:
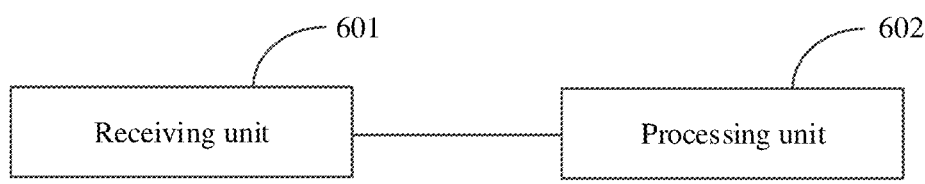
FIG. 6 is a schematic structural diagram of a device.

Based on the same concept as the method embodiment, an embodiment further provides a device, configured to perform the method performed by the first device 100 in the foregoing method embodiment. For a related feature, refer to the foregoing method embodiment. Details are not described herein again. As shown in FIG. 6, the device includes a receiving 601 and a processing unit 602.

The receiving unit 601 is configured to: receive a migration instruction sent by a second device; receive a memory bitmap that is of a to-be-migrated virtual machine and that is sent by the second device, where the memory bitmap is used to indicate whether data of each memory unit in a memory of the to-be-migrated virtual machine is stored in a non-volatile memory or a non-volatile memory, and both the to-be-migrated virtual machine and a target virtual machine include a non-volatile memory and a volatile memory; and receive data that is in the memory of the to-be-migrated virtual machine and that is sent by the second device. The receiving unit 601 is configured to perform the receiving method performed by the first device 100 in step 502, step 503, step 504, step 505, and step 506 in the embodiment shown in FIG. 5.

The processing unit 602 is configured to: create the target virtual machine of the to-be-migrated virtual machine that is in the first device 100 according to the migration instruction, and store data in the memory of the to-be-migrated virtual machine into a volatile memory and a non-volatile memory that are of the target virtual machine based on the memory bitmap. The processing unit 602 is configured to perform the method in which the first device stores the memory data of the to-be-migrated virtual machine in step 506 in the embodiment shown in FIG. 5, and the method in which the first device 100 stores the memory updating data of the to-be-migrated virtual machine and updates the memory bitmap of the virtual machine in step 507.

In a possible implementation, when storing, based on the memory bitmap, the data in the memory of the to-be-migrated virtual machine into the volatile memory and the non-volatile memory that are of the target virtual machine, the processing unit 602 may first sequentially migrate the data in the memory of the to-be-migrated virtual machine into the volatile memory of the target virtual machine. In a migration process, it is determined whether data in the volatile memory is greater than or equal to a preset threshold. When the data in the volatile memory is greater than or equal to the preset threshold, data that is currently stored in the volatile memory of the target virtual machine but should be stored in the non-volatile memory according to an indication of the memory bitmap is migrated to the non-volatile memory based on the memory bitmap.

In a possible implementation, when storing, based on the memory bitmap, the data in the memory of the to-be-migrated virtual machine into the volatile memory and the non-volatile memory that are of the target virtual machine, and each time the receiving unit 601 receives a data packet transmitted by the second device, the processing unit 602 may further determine, based on the memory bitmap, whether data of each memory unit included in the data packet is stored in the volatile memory or the non-volatile memory. Data that is of the memory unit in the data packet and that is stored in the volatile memory according to the indication of the memory bitmap is stored in the volatile memory of the target virtual machine. In addition, data that is of the memory unit in the data packet and that is stored in the non-volatile memory according to the indication of the memory bitmap is stored in the non-volatile memory of the target virtual machine.

In a possible implementation, when the processing unit 602 stores, based on the memory bitmap, the memory data of the to-be-migrated virtual machine into the volatile memory and the non-volatile memory that are of the target virtual machine, the receiving unit 601 may further receive memory rewriting data that is sent by the second device and that is during migration of the data in the memory of the to-be-migrated virtual machine, location information that is of a memory unit into which the memory rewriting data is written and that is in the memory bitmap, and an updating bit of the memory bitmap. The updating bit is used to indicate whether the memory rewriting data is stored in the non-volatile memory or the non-volatile memory.

The processing unit 602 may update the memory rewriting data to the volatile memory or the non-volatile memory of the target virtual machine based on the location information that is of the memory unit into which the memory rewriting data is written and that is in the memory bitmap and update a corresponding bit in the memory bitmap based on the updating bit of the memory bitmap.

In a possible implementation, when the processing unit 602 stores, based on the memory bitmap, the data in the memory of the to-be-migrated virtual machine into the volatile memory and the non-volatile memory that are of the target virtual machine, the receiving unit 601 may further receive memory write data that is sent by the second device and that is during migration of the data in the memory of the to-be-migrated virtual machine, location information that is of a memory unit into which the memory write data is written and that is in the memory bitmap, and an updating bit of the memory bitmap. The updating bit is used to indicate whether the memory write data is stored in the non-volatile memory or the non-volatile memory.

The processing unit 602 may further store the memory write data into the volatile memory or the non-volatile memory of the target virtual machine based on the location information that is of the memory unit into which the memory write data is written and that is in the memory bitmap and add the updating bit of the memory bitmap to the memory bitmap.

Figure 7:
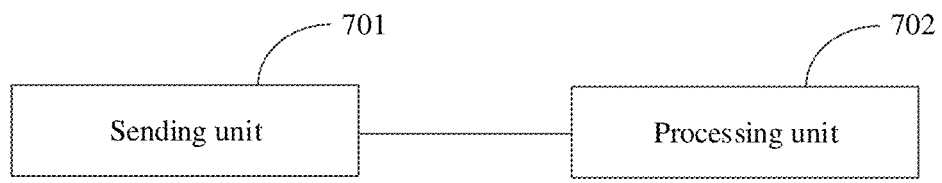
FIG. 7 is a schematic structural diagram of a device.

Based on the same concept as the method embodiment, an embodiment further provides a device, configured to perform the method performed by the second device in the foregoing method embodiment. For a related feature, refer to the foregoing method embodiment. Details are not described herein again. As shown in FIG. 7, the device includes a sending unit 701 and a processing module 702.

The sending unit 701 is configured to: send a migration instruction to a first device, where the migration instruction is used to instruct the first device to create a target virtual machine corresponding to a to-be-migrated virtual machine in the first device, and the migration instruction includes configuration information of the to-be-migrated virtual machine; send a memory bitmap of the to-be-migrated virtual machine to the first device, where the memory bitmap is used to indicate whether data that is of each memory unit in a memory of the to-be-migrated virtual machine and that is in the memory bitmap is stored in a non-volatile memory or a non-volatile memory, and the to-be-migrated virtual machine includes a non-volatile memory and a volatile memory; and send data in the memory of the to-be-migrated virtual machine to the first device. The sending unit 701 is configured to perform the method performed by the second device 200 in step 501, step 503, step 504, and step 506 in the embodiment shown in FIG. 5.

In a possible implementation, before the sending unit 701 sends the memory bitmap of the to-be-migrated virtual machine to the first device, the processing unit 702 may determine, based on a physical address of each memory unit in the memory of the to-be-migrated virtual machine, whether data of each memory unit in the memory of the to-be-migrated virtual machine is stored in the non-volatile memory or the non-volatile memory, and generate the memory bitmap of the to-be-migrated virtual machine. The processing unit 702 is configured to perform the method performed by the second device 200 in the embodiment shown in FIG. 2.

In a possible implementation, the processing unit 702 may further record, in a process of sending the data in the memory of the to-be-migrated virtual machine to the first device, memory rewriting data of the to-be-migrated virtual machine and location information that is of a memory unit into which the memory rewriting data is written and that is in the memory bitmap; and generate an updating bit of the memory bitmap, where the updating bit is used to indicate whether the memory rewriting data is stored in the non-volatile memory or the non-volatile memory.

The sending unit 701 may send, to the first device, the memory rewriting data of the to-be-migrated virtual machine, the location information that is of the memory unit into which the memory rewriting data is written and that is in the memory bitmap, and the updating bit of the memory bitmap.

In a possible implementation, the processing unit 702 may further record, in a process of sending the data in the memory of the to-be-migrated virtual machine to the first device, memory write data of the to-be-migrated virtual machine and location information that is of a memory unit into which the memory write data is written and that is in the memory bitmap; and generate an updating bit of the memory bitmap, where the updating bit is used to indicate whether the memory write data is stored in the non-volatile memory or the non-volatile memory.

The sending unit 701 may send, to the first device, the memory write data of the to-be-migrated virtual machine, the location information that is of the memory unit into which the memory write data is written and that is in the memory bitmap, and the updating bit of the memory bitmap.

Figure 8:
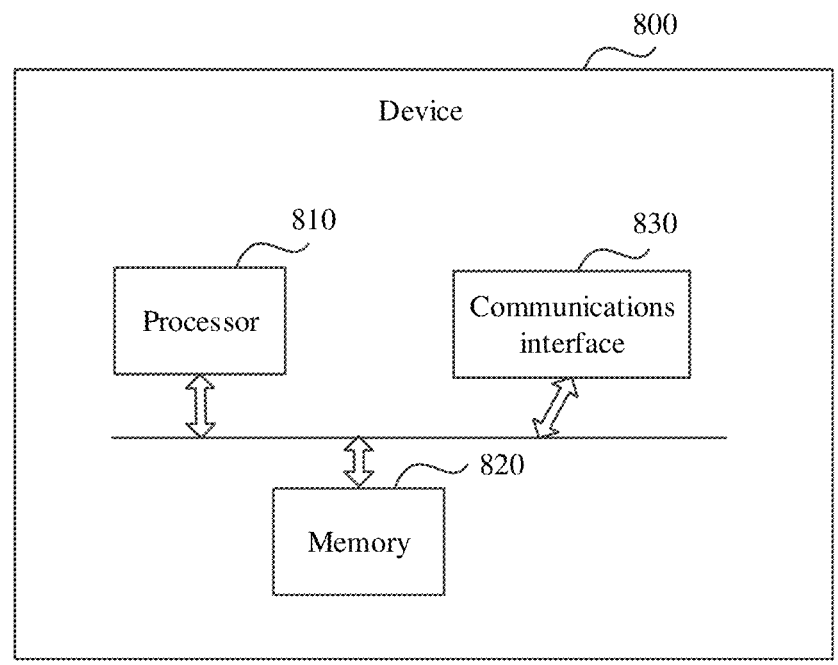
FIG. 8 is a schematic structural diagram of a device.

In a simple embodiment, a person skilled in the art may think of that the device (the first device 100 or the second device 200) in the foregoing embodiment may use a form shown in FIG. 8.

A device 800 shown in FIG. 8 includes at least one processor 810 and a memory 820. Optionally, the device 800 may further include a communications interface 830.

The memory 820 includes a volatile memory and a non-volatile memory and may further include another storage medium.

A connection medium between the processor 810 and the memory 820 is not limited in this embodiment.

The device in FIG. 8 further includes the communications interface 830. When communicating with another device, the processor 810 may transmit data by using the communications interface 830.

When the first device 100 uses the form shown in FIG. 8, the processor 810 in FIG. 8 may invoke computer-executable instructions stored in the memory 820, so that the device 800 may perform the method performed by the first device 100 in any one of the foregoing method embodiments. For example, the device 800 may perform the method performed by the first device 100 in step 502, step 503, step 504, step 505, and step 506 in the method embodiment shown in FIG. 5.

Functions/implementation processes of the receiving unit and the processing unit in FIG. 6 may be implemented by invoking, by the processor 810 in FIG. 8, the computer-executable instructions stored in the memory 820. Alternatively, a function/an implementation process of the processing unit in FIG. 8 may be implemented by invoking, by the processor 810 in FIG. 8, the computer-executable instructions stored in the memory 820. A function/an implementation process of the receiving unit in FIG. 8 may be implemented by using the communications interface 830 in FIG. 8.

When the second device 200 uses the form shown in FIG. 8, the processor 810 in FIG. 8 may invoke the computer-executable instructions stored in the memory 820, so that the device 800 may perform the method performed by the second device 200 in any one of the foregoing method embodiments. For example, the device 800 may perform the method performed by the second device 200 in the method embodiment shown in FIG. 2, or perform the method performed by the second device 200 in the method embodiment shown in FIG. 5.

Functions/implementation processes of the receiving unit and the processing unit in FIG. 8 may be implemented by invoking, by the processor 810 in FIG. 8, the computer-executable instructions stored in the memory 820. Alternatively, the function/implementation process of the processing unit in FIG. 8 may be implemented by invoking, by the processor 810 in FIG. 8, the computer-executable instructions stored in the memory 820. The function/implementation process of the receiving unit in FIG. 8 may be implemented by using the communications interface 830 in FIG. 8.

A person skilled in the art should understand that the embodiments may be provided as a method, a system, or a computer program product. This embodiment may use a form of a computer program product that is implemented on one or more computer-usable storage media (including but not limited to a magnetic disk memory, a CD-ROM, an optical memory, and the like) that include computer-usable program code.

These embodiments are described with reference to the flowcharts and/or block diagrams of the method, the device (system), and the computer program product according to the embodiments. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a processor of any other programmable data processing device to generate a machine, so that an apparatus for implementing a function in one or more processes in the flowcharts and/or in one or more blocks in the block diagrams is generated through the instructions executed by a computer or a processor of any other programmable data processing device.

These computer program instructions may alternatively be stored in a computer-readable memory that can instruct the computer or any other programmable data processing device so that an artifact that includes an instruction apparatus is generated through the instructions stored in the computer-readable memory. The instruction apparatus implements a function in one or more processes in the flowcharts and/or in one or more blocks in the block diagrams.

These computer program instructions may be loaded onto a computer or another programmable data processing device, so that a series of operations and steps are performed on the computer or another programmable device, thereby generating computer-implemented processing. Therefore, the instructions executed on the computer or another programmable device provide steps for implementing a function in one or more processes in the flowcharts and/or in one or more blocks in the block diagrams.

A person skilled in the art can make various modifications and variations to embodiments without departing from the scope of the embodiments.

What is claimed is:

1. A virtual machine migration method, performed by a first device, comprising:
   receiving a migration instruction sent by a second device;
   creating a target virtual machine of a to-be-migrated virtual machine that is in the first device according to the migration instruction;
   create a memory bitmap on the second device by the second device and store the memory bitmap in the non-volatile memory and the volatile memory of the second device, wherein the memory bitmap maps based on a set of memory units;
   receiving the memory bitmap that is of the to-be-migrated virtual machine and that is sent by the second device, wherein the memory bitmap is used to indicate whether data of each of the memory units in a memory of the to-be-migrated virtual machine is stored in a non-volatile memory or a volatile memory, and both the to-be-migrated virtual machine and the target virtual machine comprise a non-volatile memory and a volatile memory;
   receiving the data that is in the memory of the to-be-migrated virtual machine and that is sent by the second device; and
   storing the data in the memory of the to-be-migrated virtual machine into the volatile memory and the non-volatile memory that are of the target virtual machine based on the memory bitmap,
   wherein the data is stored sequentially based on a preset threshold in the volatile memory and when data in the volatile memory is greater than the preset threshold, store the data to the non-volatile memory of the target virtual machine based on the memory bitmap.

2. The virtual machine migration method according to claim 1, wherein the storing of the data in the memory of the to-be-migrated virtual machine into the volatile memory and the non-volatile memory that are of the target virtual machine based on the memory bitmap further comprises:
   sequentially migrating the data in the memory of the to-be-migrated virtual machine into the volatile memory of the target virtual machine;
   when the data in the volatile memory is greater than or equal to the preset threshold, migrating, to the non-volatile memory of the target virtual machine based on the memory bitmap, data that is currently stored in the volatile memory of the target virtual machine but should be stored in the non-volatile memory according to an indication of the memory bitmap.

3. The virtual machine migration method according to claim 1, wherein the storing of the data in the memory of the to-be-migrated virtual machine into the volatile memory and the non-volatile memory that are of the target virtual machine based on the memory bitmap further comprises:
   each time a data packet transmitted by the second device is received, determining, based on the memory bitmap, whether data of each memory unit comprised in the data packet is stored in the volatile memory or the non-volatile memory;
   storing, in the volatile memory of the target virtual machine, data that is of the memory unit in the data packet and that is stored in the volatile memory according to an indication of the memory bitmap; and
   storing, in the non-volatile memory of the target virtual machine, data that is of the memory unit in the data packet and that is stored in the non-volatile memory according to the indication of the memory bitmap.

4. The virtual machine migration method according to claim 1, wherein the storing of the data in the memory of the to-be-migrated virtual machine into the volatile memory and the non-volatile memory that are of the target virtual machine based on the memory bitmap further comprises:
   receiving memory rewriting data that is sent by the second device and that is during migration of the data in the memory of the to-be-migrated virtual machine, location information that is of a memory unit into which the memory rewriting data is written and that is in the memory bitmap, and an updating bit of the memory bitmap, wherein the updating bit is used to indicate whether the memory rewriting data is stored in the non-volatile memory or the non-volatile memory;
   updating the memory rewriting data to the volatile memory or the non-volatile memory of the target virtual machine based on the location information that is of the memory unit into which the memory rewriting data is written and that is in the memory bitmap; and
   updating a corresponding bit in the memory bitmap based on the updating bit of the memory bitmap.

5. The virtual machine migration method according to claim 1, wherein the storing of the data in the memory of the to-be-migrated virtual machine into the volatile memory and the non-volatile memory that are of the target virtual machine based on the memory bitmap further comprises:
   receiving memory write data that is sent by the second device and that is during migration of the data in the memory of the to-be-migrated virtual machine, location information that is of a memory unit into which the memory write data is written and that is in the memory bitmap, and an updating bit of the memory bitmap, wherein the updating bit is used to indicate whether the memory write data is stored in the non-volatile memory or the non-volatile memory;

storing the memory write data into the volatile memory or the non-volatile memory of the target virtual machine based on the location information that is of the memory unit into which the memory write data is written and that is in the memory bitmap; and adding the updating bit of the memory bitmap to the memory bitmap.

6. A virtual machine migration device comprising:
a memory storing instructions; and
a processor coupled to the memory to execute the instructions to:
receive a migration instruction sent by a second device;
create a memory bitmap on the second device and store the memory bitmap in the non-volatile memory and the volatile memory of the second device, wherein the memory bitmap maps based on a set of memory units;
receive the memory bitmap that is of a to-be-migrated virtual machine and that is sent by the second device, wherein the memory bitmap is used to indicate whether data of each of the memory units in a memory of the to-be-migrated virtual machine is stored in a non-volatile memory or a volatile memory, and both the to-be-migrated virtual machine and a target virtual machine comprise a non-volatile memory and a volatile memory;
receive the data that is in the memory of the to-be-migrated virtual machine and that is sent by the second device;
create the target virtual machine of the to-be-migrated virtual machine that is in a first device according to the migration instruction; and
store the data in the memory of the to-be-migrated virtual machine into the volatile memory and the non-volatile memory that are of the target virtual machine based on the memory bitmap, wherein the data is stored sequentially based on a preset threshold in the volatile memory and when the data in the volatile memory is greater than the preset threshold, store the data to the non-volatile memory of the target virtual machine based on the memory bitmap.

7. The virtual machine migration device according to claim 6, wherein in a process of storing the data in the memory of the to-be-migrated virtual machine into the volatile memory and the non-volatile memory that are of the target virtual machine based on the memory bitmap, the processor is further configured to:
sequentially migrate the data in the memory of the to-be-migrated virtual machine into the volatile memory of the target virtual machine;
and
when the data in the volatile memory is greater than or equal to the preset threshold, migrate, to the non-volatile memory based on the memory bitmap, data that is currently stored in the volatile memory of the target virtual machine but should be stored in the non-volatile memory according to an indication of the memory bitmap.

8. The virtual machine migration device according to claim 6, wherein in a process of storing the data in the memory of the to-be-migrated virtual machine into the volatile memory and the non-volatile memory that are of the target virtual machine based on the memory bitmap, the processor is further configured to:
each time a data packet transmitted by the second device is received, determine, based on the memory bitmap, whether data of each memory unit comprised in the data packet is stored in the volatile memory or the non-volatile memory;
store, in the volatile memory of the target virtual machine, data that is of the memory unit in the data packet and that is stored in the volatile memory according to an indication of the memory bitmap; and
store, in the non-volatile memory of the target virtual machine, data that is of the memory unit in the data packet and that is stored in the non-volatile memory according to the indication of the memory bitmap.

9. The virtual machine migration device according to claim 6, wherein when storing the data in the memory of the to-be-migrated virtual machine into the volatile memory and the non-volatile memory that are of the target virtual machine based on the memory bitmap, the processor is further configured to:
receive memory rewriting data that is sent by the second device and that is during migration of the data in the memory of the to-be-migrated virtual machine, location information that is of a memory unit into which the memory rewriting data is written and that is in the memory bitmap, and an updating bit of the memory bitmap, wherein the updating bit is used to indicate whether the memory rewriting data is stored in the non-volatile memory or the non-volatile memory; and
update the memory rewriting data to the volatile memory or the non-volatile memory of the target virtual machine based on the location information that is of the memory unit into which the memory rewriting data is written and that is in the memory bitmap; and
update a corresponding bit in the memory bitmap based on the updating bit of the memory bitmap.

10. The virtual machine migration device according to claim 6, wherein when storing the data in the memory of the to-be-migrated virtual machine into the volatile memory and the non-volatile memory that are of the target virtual machine based on the memory bitmap, the processor is further configured to:
receive memory write data that is sent by the second device and that is during migration of the data in the memory of the to-be-migrated virtual machine, location information that is of a memory unit into which the memory write data is written and that is in the memory bitmap, and an updating bit of the memory bitmap, wherein the updating bit is used to indicate whether the memory write data is stored in the non-volatile memory or the non-volatile memory; and
store the memory write data into the volatile memory or the non-volatile memory of the target virtual machine based on the location information that is of the memory unit into which the memory write data is written and that is in the memory bitmap; and
add the updating bit of the memory bitmap to the memory bitmap.

11. A virtual machine migration device comprising:
a memory storing instructions; and
a processor coupled to the memory to execute the instructions to:
send a migration instruction to a first device, wherein the migration instruction is used to instruct the first device to create a target virtual machine corresponding to a to-be-migrated virtual machine in the first device;
create a memory bitmap on the second device and store the memory bitmap in the non-volatile memory and the volatile memory of the second device, wherein the memory bitmap maps based on a set of memory units;

send the memory bitmap of the to-be-migrated virtual machine to the first device, wherein the memory bitmap is used to indicate whether data in each of the memory units of the to-be-migrated virtual machine is stored in a non-volatile memory or a volatile memory, and the to-be-migrated virtual machine comprises a non-volatile memory and a volatile memory; and send the data in the memory of the to-be-migrated virtual machine to the first device, wherein sending the data sequentially based on a preset threshold in the volatile memory and when the data in the volatile memory is greater than the preset threshold, store the data to the non-volatile memory of the target virtual machine based on the memory bitmap.

12. The virtual machine migration device according to claim 11, before sending the memory bitmap of the to-be-migrated virtual machine to the first device, the processor is further configured to:

determine, based on a physical address of each memory unit in the memory of the to-be-migrated virtual machine, whether data of each memory unit in the memory of the to-be-migrated virtual machine is stored in the non-volatile memory or the non-volatile memory; and generate the memory bitmap of the to-be-migrated virtual machine.

13. The virtual machine migration device according to claim 11, wherein the processor is further configured to:

in a process of sending the data in the memory of the to-be-migrated virtual machine to the first device, record memory rewriting data of the to-be-migrated virtual machine and location information that is of a memory unit into which the memory rewriting data is written and that is in the memory bitmap; and generate an updating bit of the memory bitmap, wherein the updating bit is used to indicate whether the memory rewriting data is stored in the non-volatile memory or the non-volatile memory;

send, to the first device, the memory rewriting data, the location information that is of the memory unit into which the memory rewriting data is written and that is in the memory bitmap, and the updating bit of the memory bitmap.

14. The virtual machine migration device according to claim 11, wherein the processor is further configured to:

in a process of sending the data in the memory of the to-be-migrated virtual machine to the first device, record memory write data of the to-be-migrated virtual machine and location information that is of a memory unit into which the memory write data is written and that is in the memory bitmap; and generate an updating bit of the memory bitmap, wherein the updating bit is used to indicate whether the memory write data is stored in the non-volatile memory or the non-volatile memory; and send, to the first device, the memory write data, the location information that is of the memory unit into which the memory write data is written and that is in the memory bitmap, and the updating bit of the memory bitmap.

* * * * *